United States Patent
Tsai et al.

(10) Patent No.: US 11,161,594 B2
(45) Date of Patent: Nov. 2, 2021

(54) FLAP SUPPORT BREAKAWAY AND FAIL SAFETY CONFIGURATION

(71) Applicant: The Boeing Company, Chicago, IL (US)

(72) Inventors: Kevin R. Tsai, Seattle, WA (US); Kunal Thakar, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 16/583,024

(22) Filed: Sep. 25, 2019

(65) Prior Publication Data
US 2021/0086904 A1   Mar. 25, 2021

(51) Int. Cl.
*B64C 9/02* (2006.01)
*F16B 19/00* (2006.01)

(52) U.S. Cl.
CPC ............... *B64C 9/02* (2013.01); *F16B 19/00* (2013.01)

(58) Field of Classification Search
CPC ...................................................... B64C 9/02
See application file for complete search history.

(56) References Cited

U.S. PATENT DOCUMENTS

| | | | | |
|---|---|---|---|---|
| 3,594,851 A | * | 7/1971 | Swatton | F16C 11/045 16/276 |
| 8,490,927 B2 | * | 7/2013 | Parker | F16C 23/086 244/215 |
| 9,016,623 B2 | * | 4/2015 | Maclean | B64C 9/02 244/99.9 |
| 10,946,949 B2 | * | 3/2021 | Tsai | F16C 11/0614 |
| 2009/0308981 A1 | * | 12/2009 | McAlinden | B64C 9/16 244/213 |
| 2014/0175216 A1 | * | 6/2014 | Ishihara | B64C 9/02 244/99.3 |
| 2020/0079491 A1 | * | 3/2020 | Gruner | B64C 1/062 |
| 2021/0061441 A1 | * | 3/2021 | Gruner | B64C 9/18 |
| 2021/0062848 A1 | * | 3/2021 | Gruner | F16B 19/00 |

* cited by examiner

*Primary Examiner* — Joseph W Sanderson
(74) *Attorney, Agent, or Firm* — Felix L. Fischer

(57) ABSTRACT

A flap support mounting assembly employs a flap support having at least one laterally-oriented upper coupling and a pair of laterally-oriented lower couplings. A fail-safe pin engages the at least one laterally-oriented upper coupling to an upper rear-spar fitting. A pair of frangible pins engages the lower couplings to a pair of lower rear-spar fittings. The frangible pins are configured to shear and enable the flap support to rotate upwards about the fail-safe pin in response to a load induced on the flap support that creates a moment inducing a sufficient shear force to shear the frangible pins. The fail-safe pin is configured to shear allowing separation of the flap support and associated flap from the wing in a manner that inhibits damage to a rear spar and integral fuel tank in a wing structure.

20 Claims, 13 Drawing Sheets

FLAP SUPPORT BREAKAWAY AND FAIL SAFETY CONFIGURATION

BACKGROUND INFORMATION

Field

Implementations described in the disclosure relate generally to the field of aircraft flap support systems and, more particularly to a flap support having a laterally-oriented upper coupling that is coupled by an upper support pin to an upper rear spar fitting, and a pair of lower couplings coupled by fuse pins to a pair of lower rear spar fittings.

Background

Aircraft employ flaps which increase camber of the wings for enhanced aerodynamic efficiency in take-off and landing. Various mechanical arrangements have been developed to deploy the flaps from retracted to extended positions. Flap supports typically extend below the lower surface of the wing. Flap supports are designed for conditions where the flap supports may contact the ground which requires them to be fusible or frangible, to allow components to separate in a controlled manner which does not compromise the surrounding primary wing structure and integrity of the integral wing fuel tanks. Current design requirements provide that connection structure is failsafe and damage tolerant for any single failure of a part. This provides protection for incidental damage, as well as issues with fatiguing of the part or manufacturing defects. Existing designs achieve this requirement through extensive back-to-back parts and pin-in-pin features which may have high part count and complexity.

SUMMARY

Exemplary implementations of a flap support mounting assembly employ a flap support having at least one laterally-oriented upper coupling and a pair of laterally-oriented lower couplings. A fail-safe pin engages the at least one laterally-oriented upper coupling to an upper rear-spar fitting. A pair of frangible pins engages the lower couplings to a pair of lower rear-spar fittings. The frangible pins are configured to shear and enable the flap support to rotate upwards about the fail-safe pin in response to a load induced on the flap support that creates a moment inducing a sufficient shear force to shear the frangible pins. The fail-safe pin is configured to shear allowing separation of the flap support and associated flap from the wing in a manner that inhibits damage to a rear spar and integral fuel tank in a wing structure.

The implementations herein provide a method for disengaging a flap and flap support under adverse loading wherein a fail-safe upper support pin is rotatably constrained in an upper coupling of a flap support in an upper joint to a fitting in a wing. A pair of frangible pins are constrained in a pair of laterally oriented and laterally spaced lower couplings in the flap support. The pair of frangible pins are fractured responsive to an induced moment on the flap support about the fail-safe pin.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a flap support mounting assembly having a laterally-oriented upper coupling that is coupled by a fail-safe upper support pin to an upper rear spar fitting, and a pair of lower couplings coupled by frangible fuse pins to a pair of lower rear spar fittings to engage a flap support to a wing structure. The fuse pins are configured to shear and enable the flap support to rotate upwards in response to a force applied to the flap support, after which the fail-safe pin is configured to shear, enabled by short-coupling of the flap support and upper rear spar fitting, to allow separation of the flap support in a manner that inhibits damage to the wing structure.

Figure 1A:
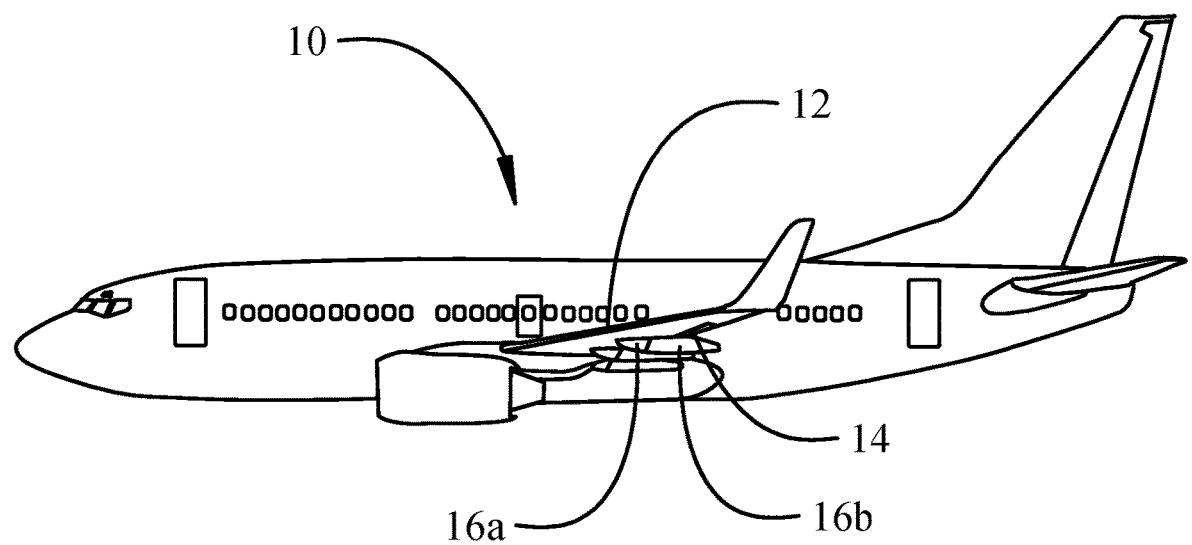
FIG. 1A is a representation of an aircraft in which the implementations disclosed herein may be employed.
Figure 1B:
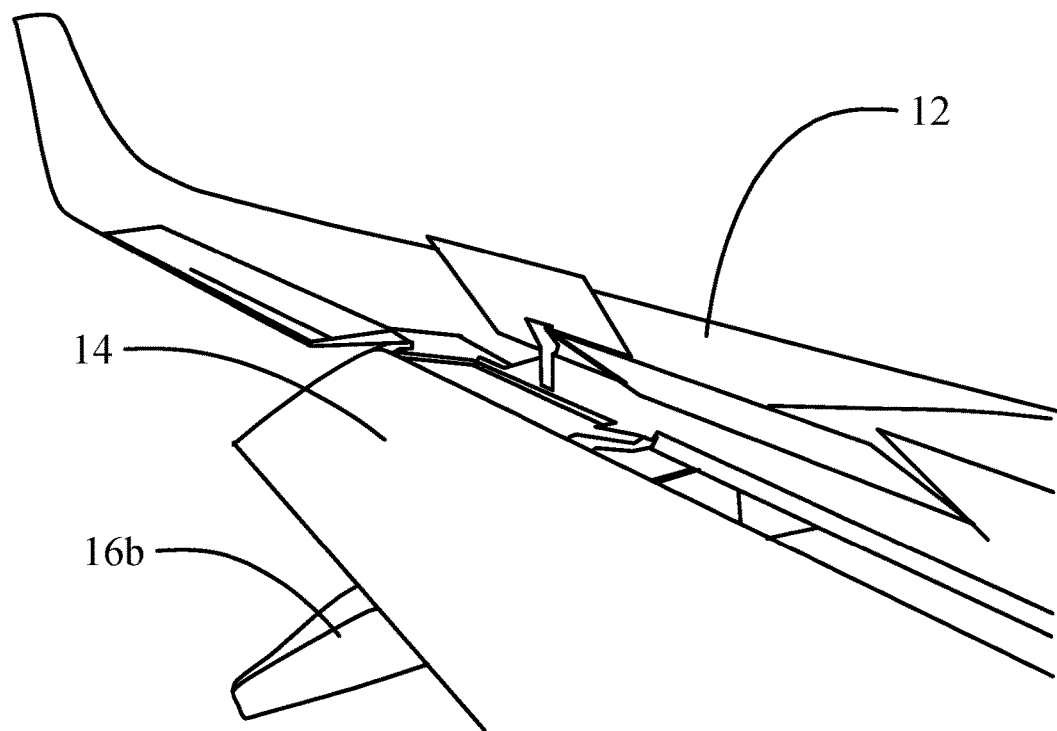
FIG. 1B is a detailed pictorial representation of the wing and flap of the aircraft of FIG. 1A.
Figure 1C:
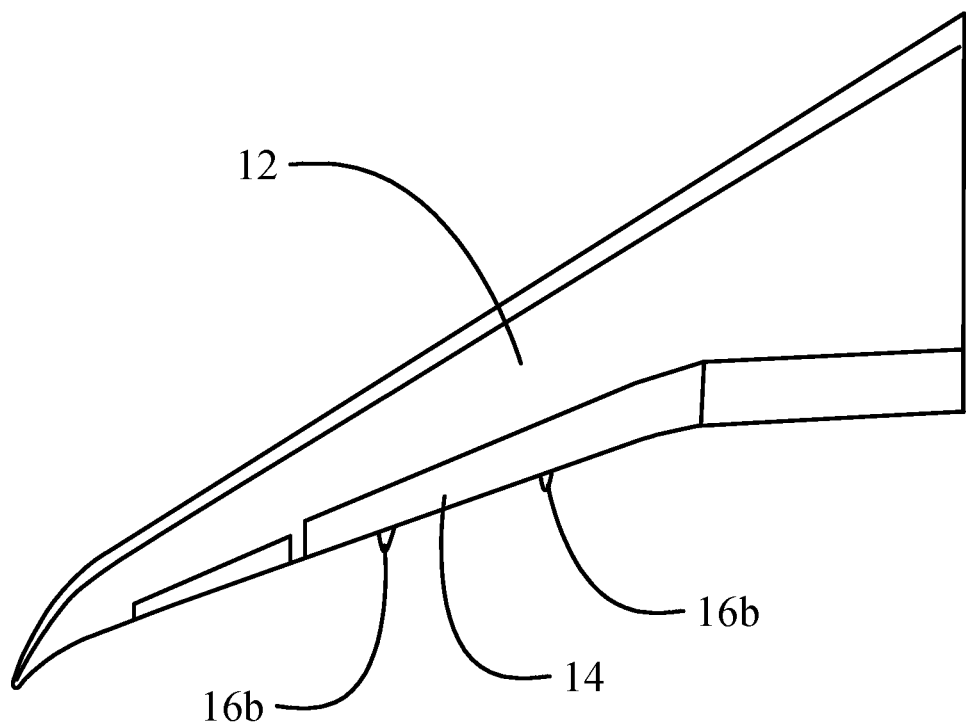
FIG. 1C is a top view of the wing and flaps of FIG. 1B.

Referring to the drawings, FIGS. 1A, 1B and 1C depict an aircraft 10 having a wing 12 with a system of operating flaps 14. The flaps 14 are engaged to the wing 12 at multiple attachment points with flap supports at least partially housed within fixed fairings 16a and movable fairings 16b. Extension of the flaps 14 to enhance aerodynamic performance during takeoff and landing is accomplished with a trailing edge flap actuation mechanism 18 that causes the flaps 14 and movable fairings 16b to rotate rearward and downward relative to the wing 12 as seen in FIG. 1B.

Figure 2:
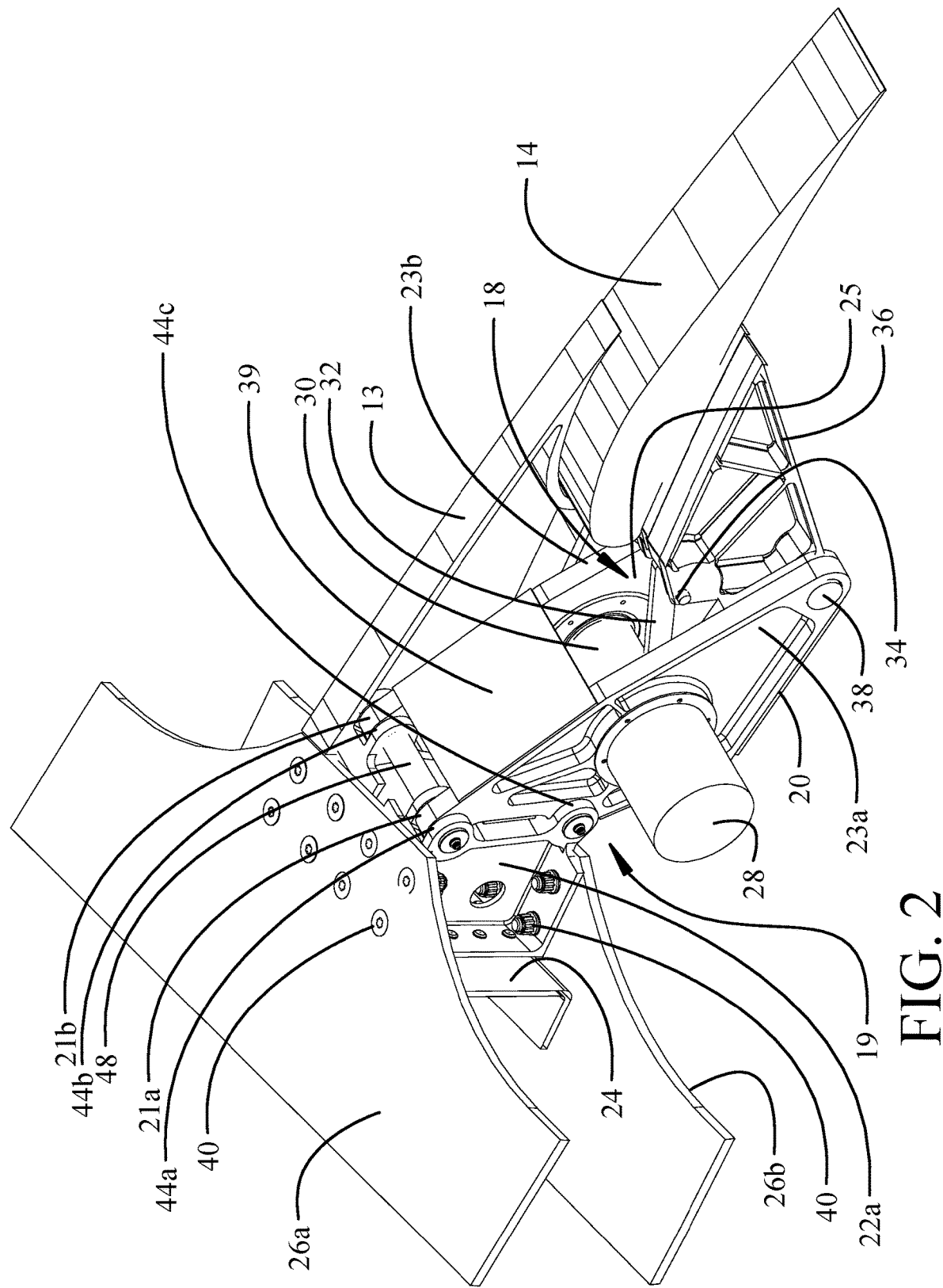
FIG. 2 is a pictorial view of an example implementation of the flap support connection system.

As seen in FIG. 2, at an example attachment point, the flap actuation mechanism 18 is supported in a flap support 20 engaged to the wing 12 with a flap support mounting assembly 19. The flap support 20 has a pair of laterally-oriented upper couplings, outboard and inboard upper lugs 21a, 21b and a pair of laterally-oriented lower couplings, outboard and inboard lower lugs 21c and 21d (oriented laterally along associated axes 102a and 102b, best seen in FIG. 4C) that are coupled laterally spaced to engage outboard and inboard rear spar fittings 22a and 22b. The outboard and inboard rear spar fittings 22a and 22b are attached to the rear spar web 24 and upper and lower wing skin sections 26a, 26b of the structure of the wing 12.

In the example implementation, a rotary actuator 28 rotates a crank assembly 30 engaging an actuating rod 32. The actuating rod 32 is rotatably attached at a first end to the crank assembly 30 and at a second end with a pivot pin 34 to a flap carrier fitting 36 mounted to the flap 14. The flap carrier fitting 36 is coupled to the flap support 20 with a pivotal coupling, axle 38 in the implementation shown. Upon rotation of the crank assembly 30 by the actuator 28, forward and aft movement of the actuating rod 32 causes rotation of the flap carrier fitting 36 to extend and retract the flap 14 between a stowed position and a deployed position relative to the flap support 20. In the example implementation, the flap support 20 has an outboard rib 23a and an inboard rib 23b forming a clevis with a slot 25 through which the actuating rod 32 extends. The outboard upper and lower lugs 21a, 21c extend from outboard rib 23a and the inboard upper and lower lugs 21b and 21d extend from the inboard rib 23b. Structural webs 39 may span the outboard and inboard ribs 21a, 21b for rigidity. The flap carrier fitting 36 is also received in the slot 25 between the outboard and inboard ribs 23a and 23b in the example implementation.

Figure 3:
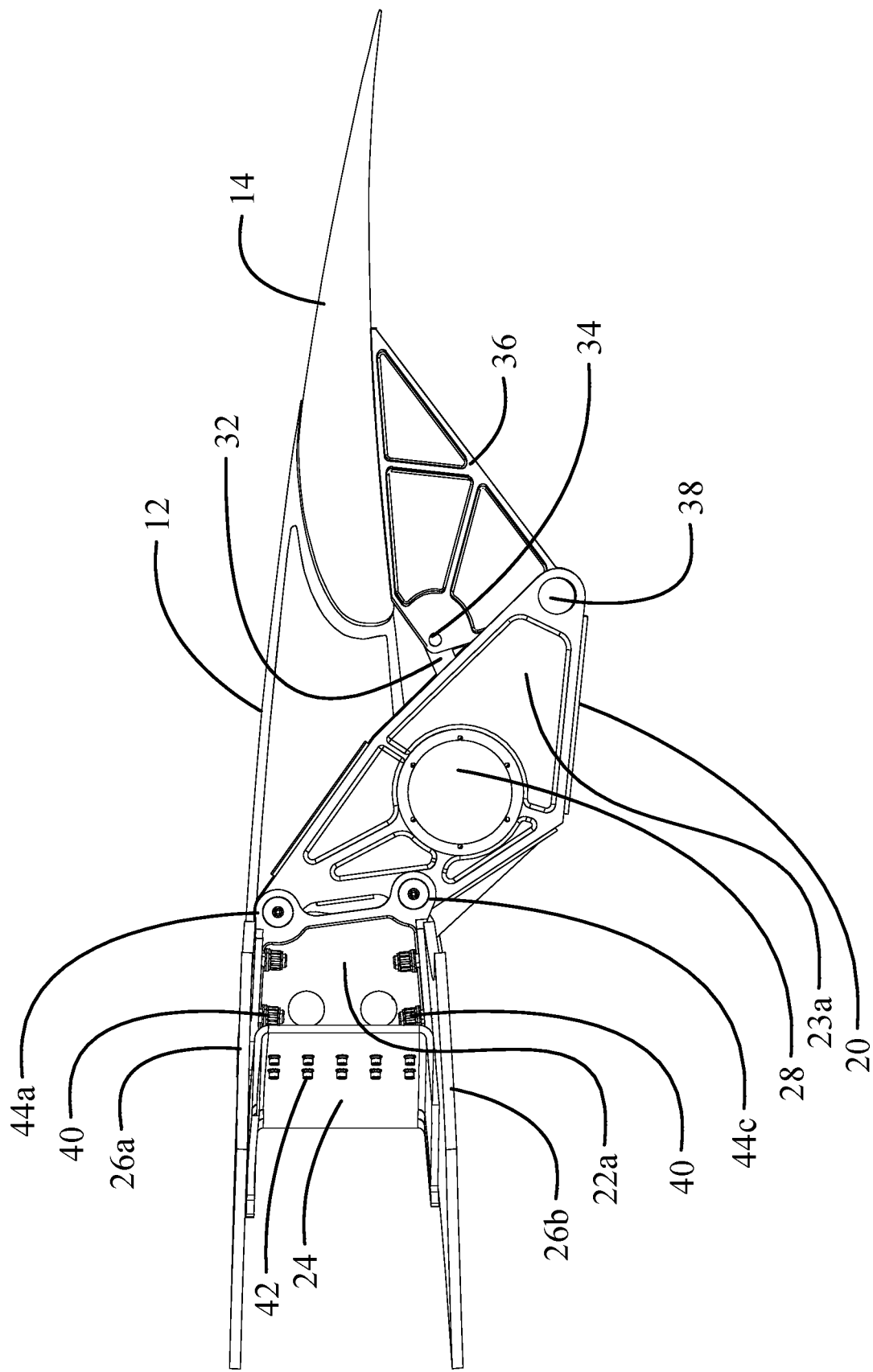
FIG. 3 is a side view of the implementation of FIG. 2.
Figure 4A:
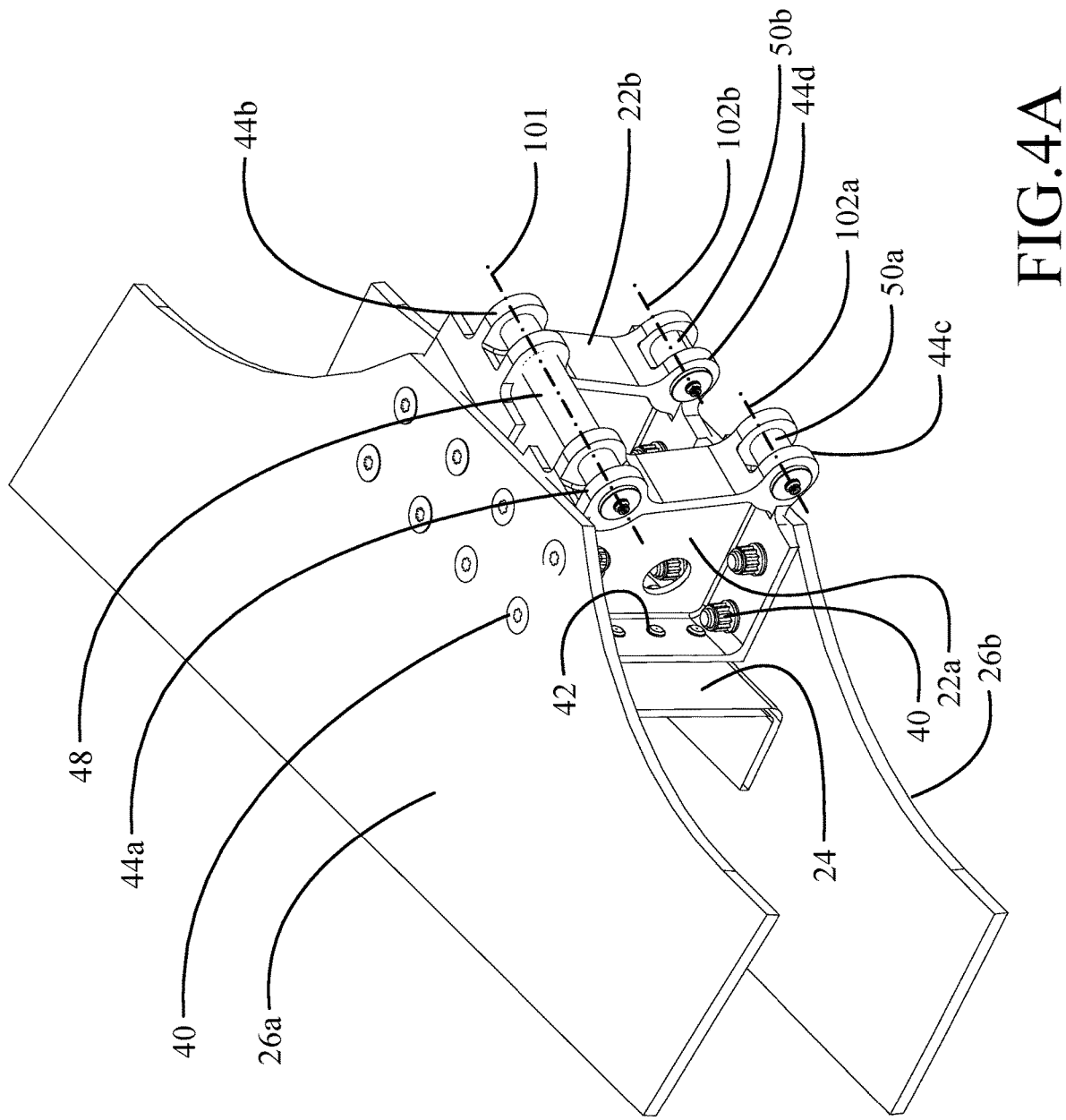
FIG. 4A is a pictorial view of the example implementation of the flap support connection system with the flap support, flap actuation mechanism, flap and aft wing section removed for clarity.
Figure 4B:
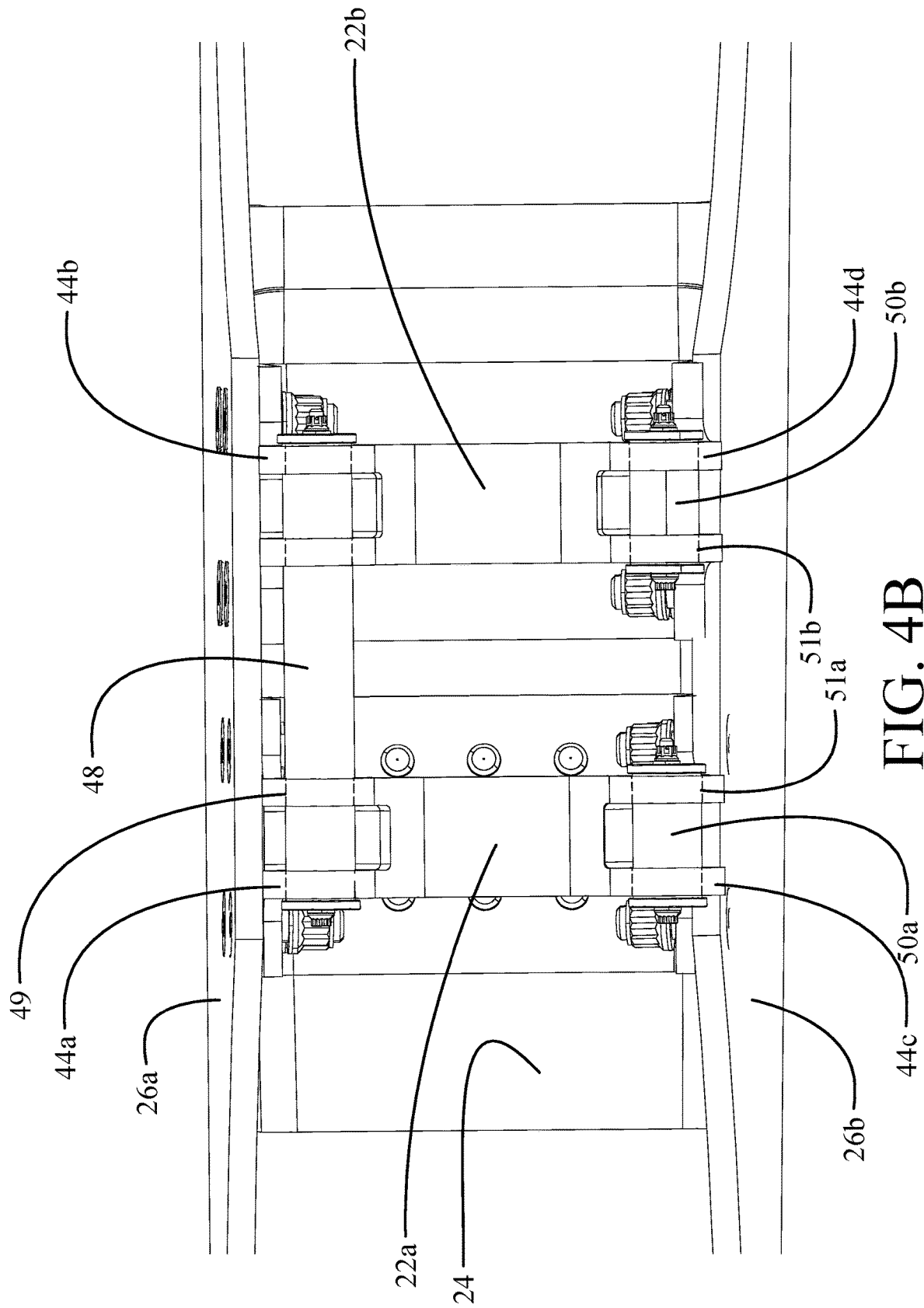
FIG. 4B is an aft view of the example implementation of the flap support connection system with the flap support, flap actuation mechanism, flap and aft wing section removed for clarity.
Figure 4C:
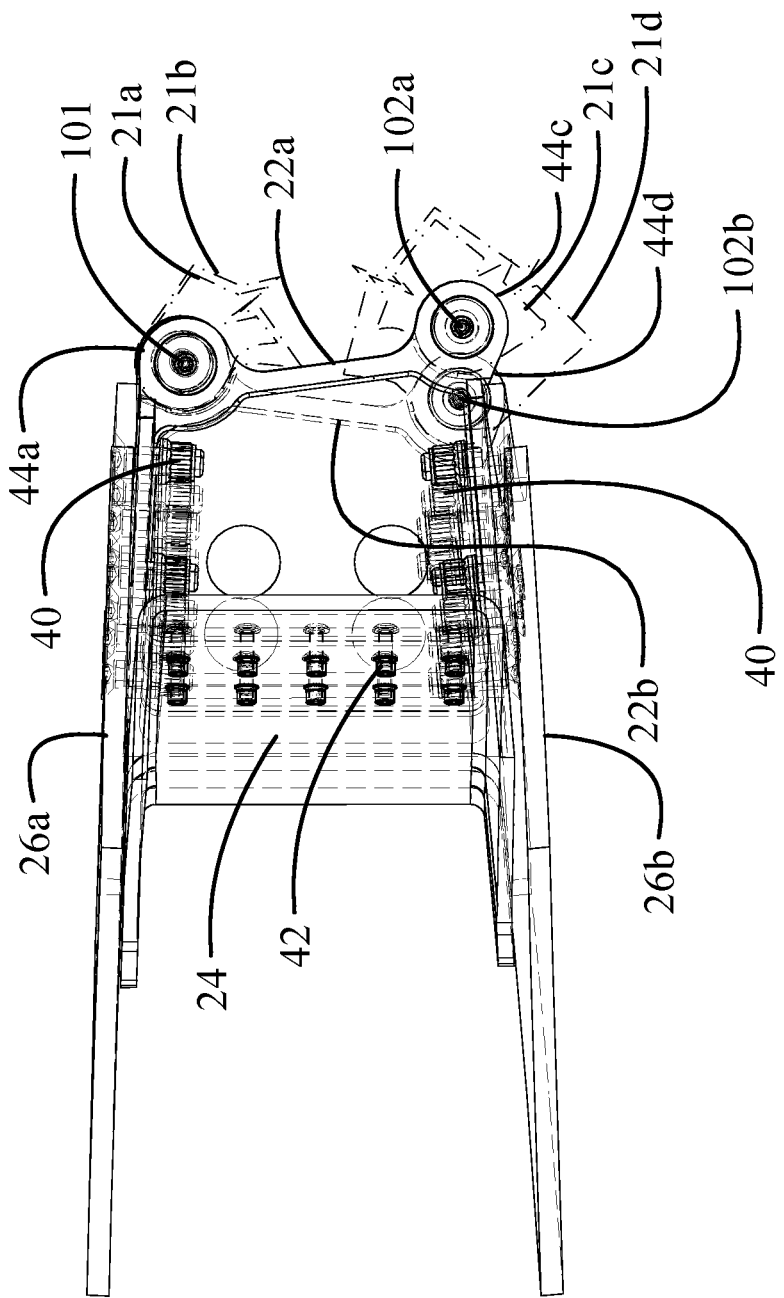
FIG. 4C is a side view of the example implementation of the flap support connection system with the flap support, flap actuation mechanism, flap and aft wing section removed for clarity.

As seen in FIGS. 2 and 3 and in detail in FIGS. 4A-4C, with the flap support 20, flap actuation mechanism 18 and flap 14 removed for clarity, the rear spar fittings 22a, 22b, for the example shown, are bolted with fasteners 40 into the upper skin 26a and lower skin 26b and secured to the rear spar web 24 with rivets 42 (while rivets are shown in the exemplary implementation, any appropriate fasteners may be employed). The fasteners in the configuration shown react loads on the flap support 20 into the structure of the wing 12 as shear loads. This enables the flap support mounting assembly 19 between the flap support 20 and structure of wing 12 to shear out into the stiffest load path under induced load conditions to be described subsequently. No back up fittings are required inside the spar providing cost, weight and manufacturing assembly benefits.

The rear spar fittings 22a, 22b attach to the outboard and inboard ribs 23a, 23b of the flap support 20 through four joints, two upper joints and two lower joints. Each joint has a clevis 44a, 44b, 44c, 44d receiving an associated lug 21a, 21b, 21c, 21d on the flap support 20 (partial segments of the lugs 21a, 21b, 21c and 21d are represented in phantom in FIG. 4C). A fail-safe upper support pin 48 extends through upper aligned bores 49 in an outboard upper clevis 44a, and an inboard upper clevis 44b and the associated outboard and inboard upper lugs 21a, 21b providing a rotatable upper coupling (oriented laterally along axis 101). In alternative implementations, a single clevis extends laterally across the rear spar fittings 22a, 22b to rotatably receive the upper support pin 48 extending through a single upper lug spanning the flap support 20. An outboard lower support pin 50a extends through first lower aligned bores 51a in an outboard lower clevis 44c and outboard lower lug 21c (laterally oriented along axis 102a) while an inboard lower support pin 50b extends through second lower aligned bores Mb in an inboard lower clevis 44d and inboard lower lug 21d (laterally oriented along axis 102b). The four joints provide redundancy such that in inadvertent separation of any single joint element (lug, clevis or pin) is a "fail safe" condition where the airplane is capable of performing nominally with the remaining three joints intact. Outboard lower support pin 50a and inboard lower support pin 50b are configured to be frangible to provide fusing capability at a shear out load induced by contact of the flap support 20 with the ground or other similarly induced load, as will be described in greater detail subsequently.

Any inadvertent separation of the upper support pin 48, at, in or between either outboard and inboard upper clevis 44a or 44b, or inadvertent separation of any one of the outboard or inboard upper clevises 44a, 44b, or outboard or inboard upper lugs 21a, 21b provides a remaining upper attachment joint intact for continuing operation. Similarly, any premature fusing creating inadvertent separation of the either outboard lower support pin 50a or inboard lower support pin 50b, or inadvertent separation of any one of the outboard lower clevis 44c, inboard lower clevis 44d, or outboard or inboard lower lugs 21c, 21d provides a remaining frangible pin and lower attachment joint intact for continuing operation. In each case, the remaining elements are sufficient to withstand flap operating loads to keep the flap support securely in place during aircraft operation. Additionally, the use of two lower support pins allows the outboard and inboard lower clevises 44c, 44d and associated outboard and inboard upper lugs 21a, 21b to be longitudinally offset, perpendicular to associated axes 102a, 102b, but laterally parallel as in the example implementation for structural arrangement along the sweep of the lower wing skin 26b.

Figure 5A:
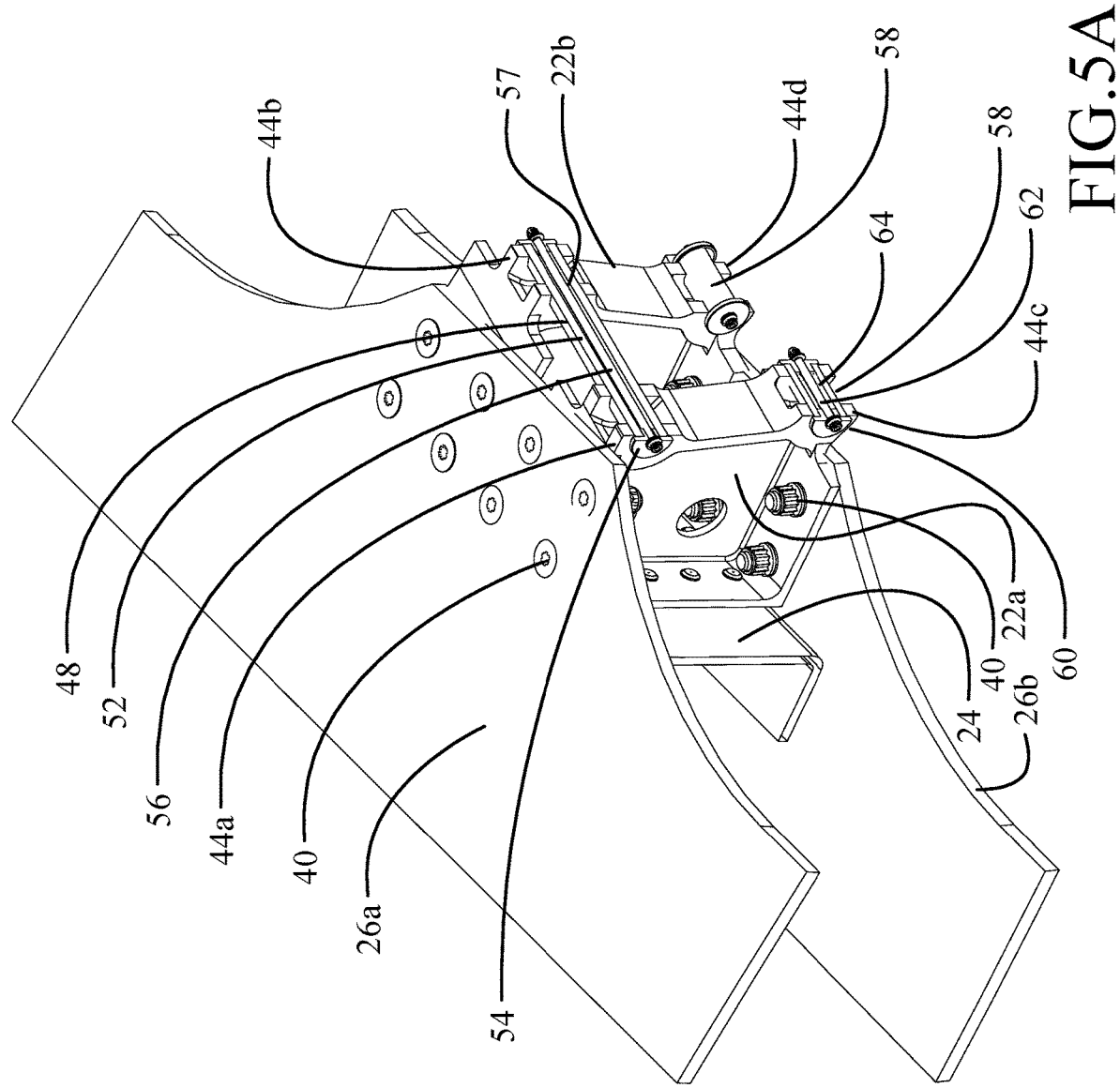
FIG. 5A is a pictorial view with partial sectioning of the upper lateral pin connection and the outboard fuse pin and associated support clevises.
Figure 5B:
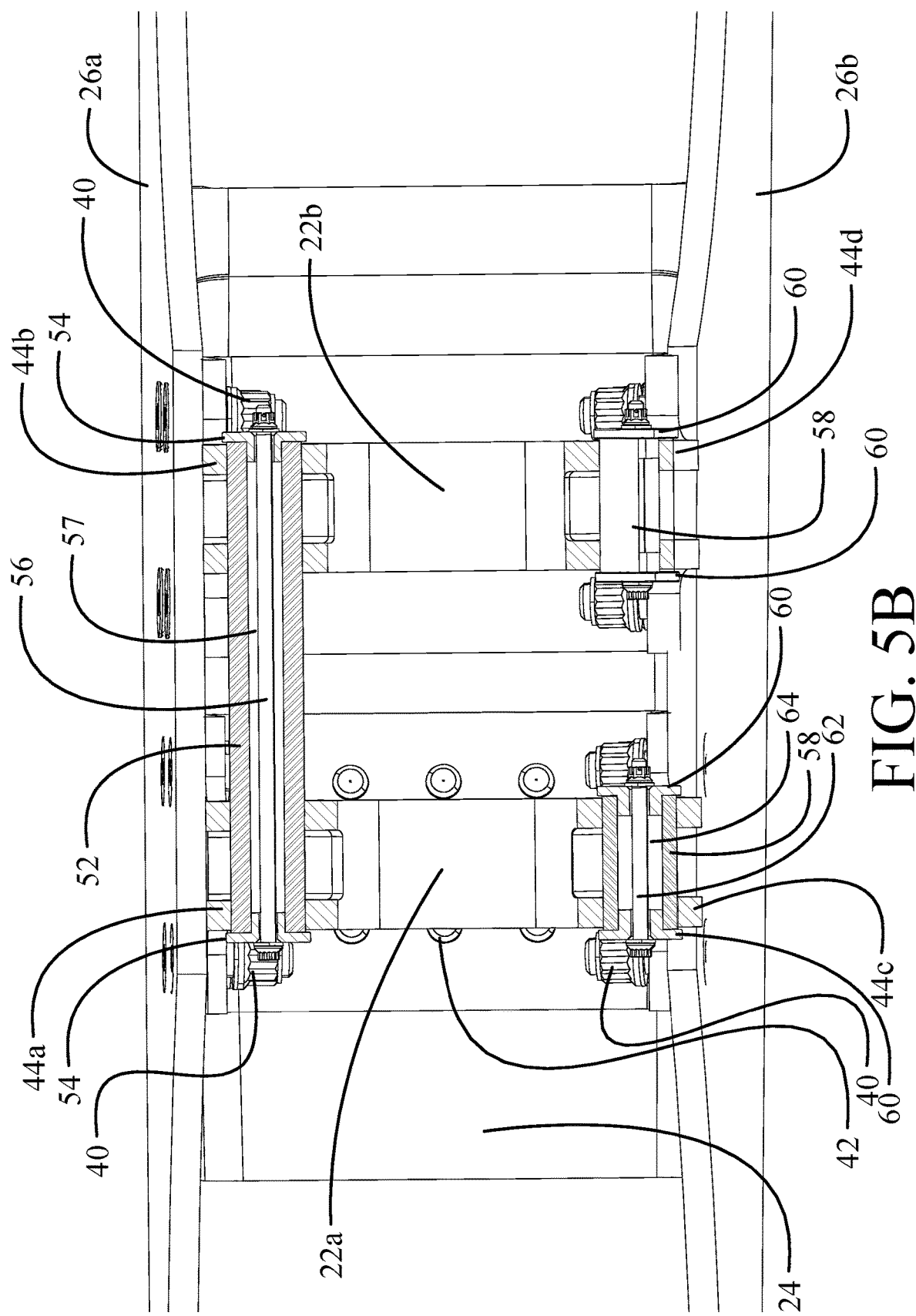
FIG. 5B is an aft view with partial sectioning of the upper lateral pin connection and the outboard fuse pin and associated support clevises.

As seen in FIGS. 5A and 5B, the upper support pin 48 is an assembly of a load capable pin 52 constrained in the outboard and inboard upper clevises 44a, 44b with retention caps 54. A retention pin 56 extends through the retention caps 54 and a center bore 57 in the load capable pin 52. The two lower support pins, as seen in sectioned outboard lower support pin 50a, incorporate load limited pins 58 constrained in the outboard and inboard lower clevises 44c, 44d with retention caps 60 and retention pins 62 extending through a center bore 64. The load limited pins 58 are configured for a fracture strength allowing them to be frangible and fuse under an imposed shear load.

Figure 6A:
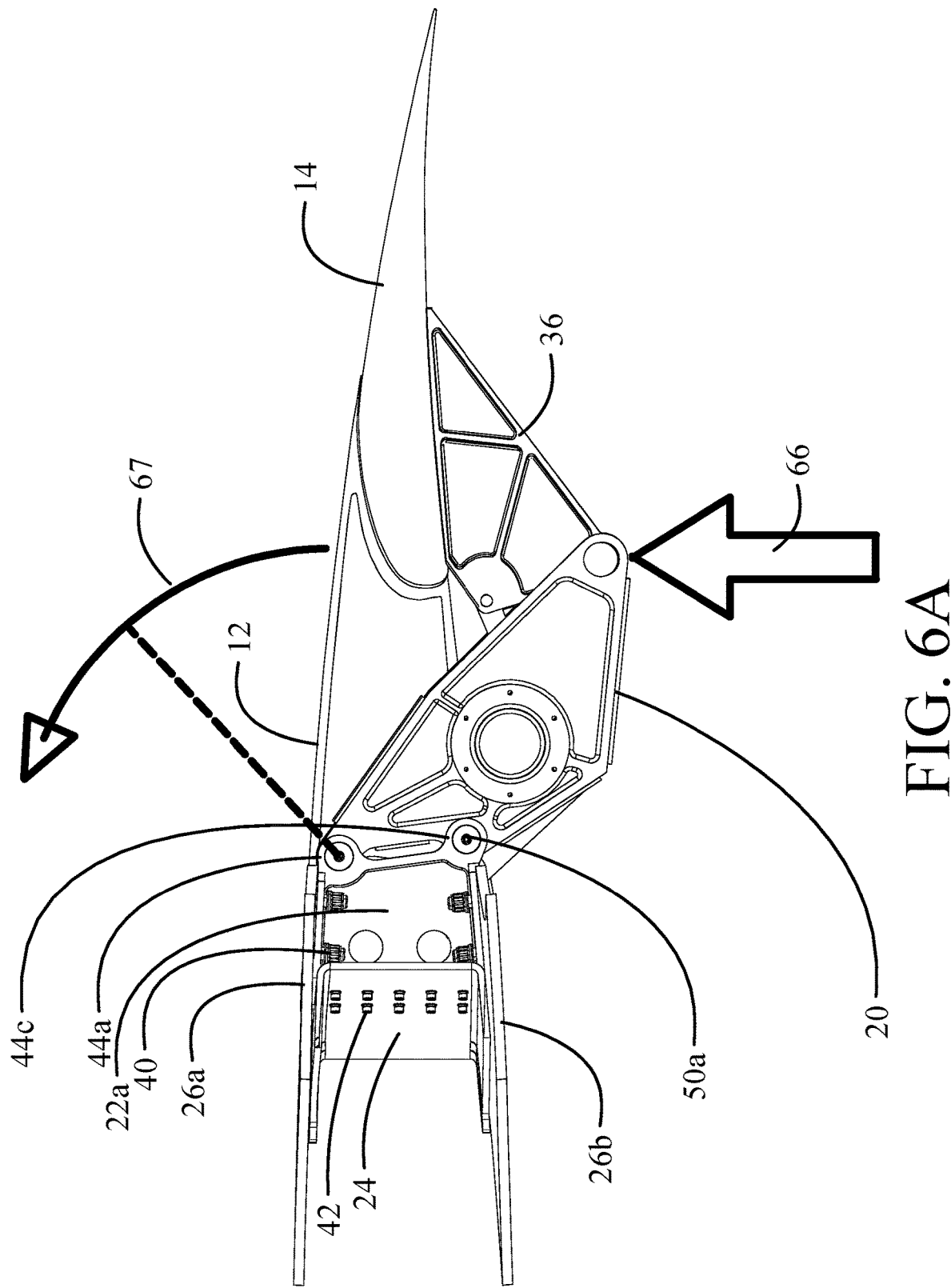
FIG. 6A is a pictorial representation of the flap support connection system in the operating condition showing an imposed load.
Figure 6B:
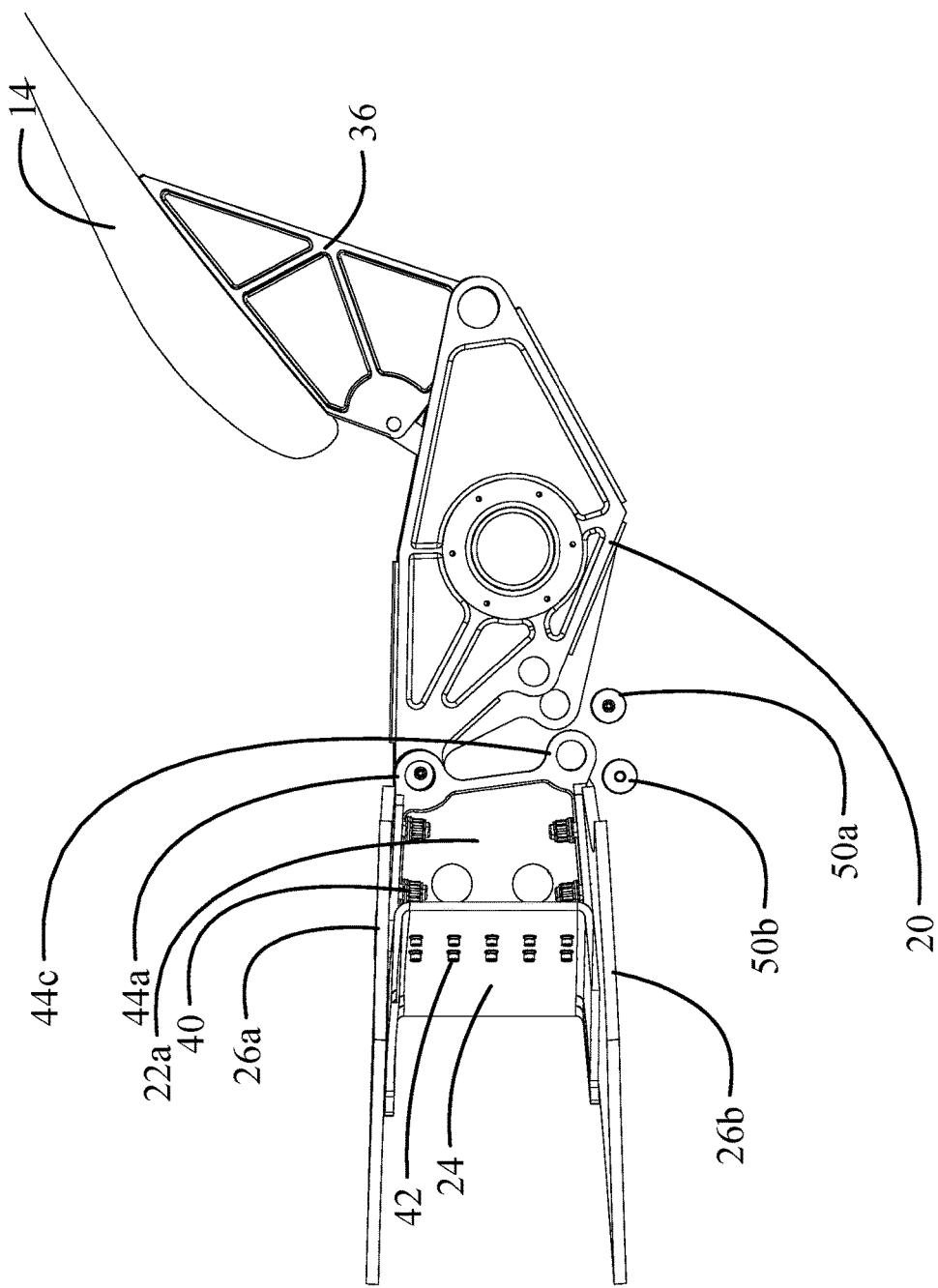
FIG. 6B is a pictorial representation of the flap support connection system in the fused and rotating condition based on the imposed load with the flap actuation mechanism, flap and aft wing section removed for clarity.
Figure 6C:
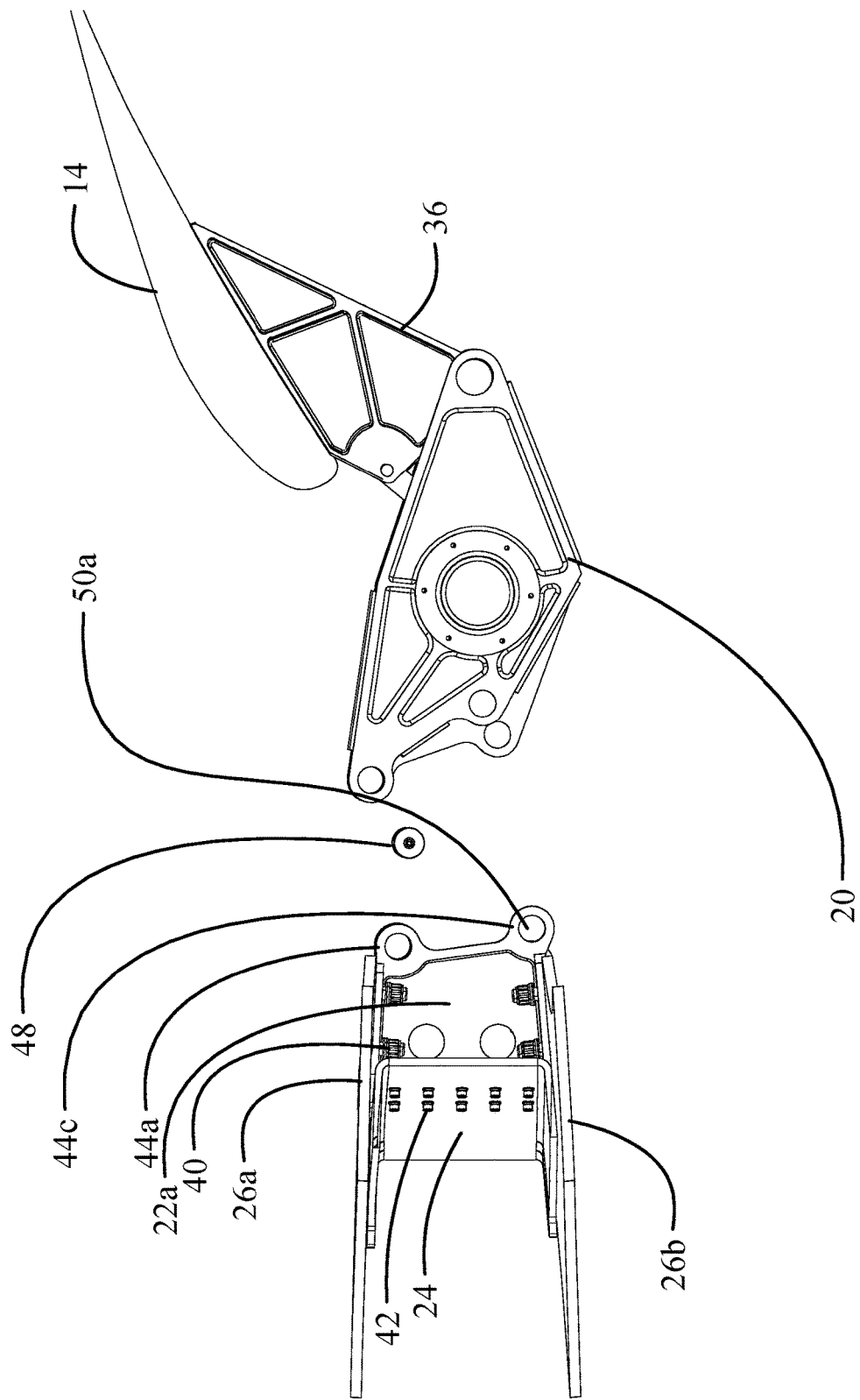
FIG. 6C is a pictorial representation of the flap support connection system in the released condition after fracture of the lateral upper support pin with the flap actuation mechanism, flap and aft wing section removed for clarity; and, FIG. 7 is a flow chart of a method for flap support separation using the exemplary implementation.

The outboard and inboard lower support pins 50a, 50b are shear load capability limited such that if the flap support is exposed to an induced load 66 as shown in FIG. 6A, which creates a moment 67 about the laterally-oriented rotatable upper joint created by the outboard and inboard upper clevises 44a, 44b, the inboard and outboard upper lugs 21a, 21b and the upper support pin 48 extending therethrough, the outboard and inboard lower support pins 50a, 50b fracture. The flap support 20 then rotates upward as shown in FIG. 6B. The rotation of the flap support 20 about the outboard and inboard upper clevises 44a, 44b induces a short coupled condition in the upper joint with related impingement of the outboard and inboard ribs 23a, 23b and structural web 39 at the interface of the upper wing skin 26a. The upper support pin 48 is configured to shear under the short coupled condition allowing the flap support 20 with the flap actuation mechanism 18 and attached flap 14 to depart the wing 12, as shown in FIG. 6C, in a manner that inhibits damage to the rear spar or the fuel tank. A single upper support pin 48 is employed to provide rotation about the single lateral axis 101 to enhance the short coupling effect while providing the desired fail safe effect for the upper joint.

Figure 7:
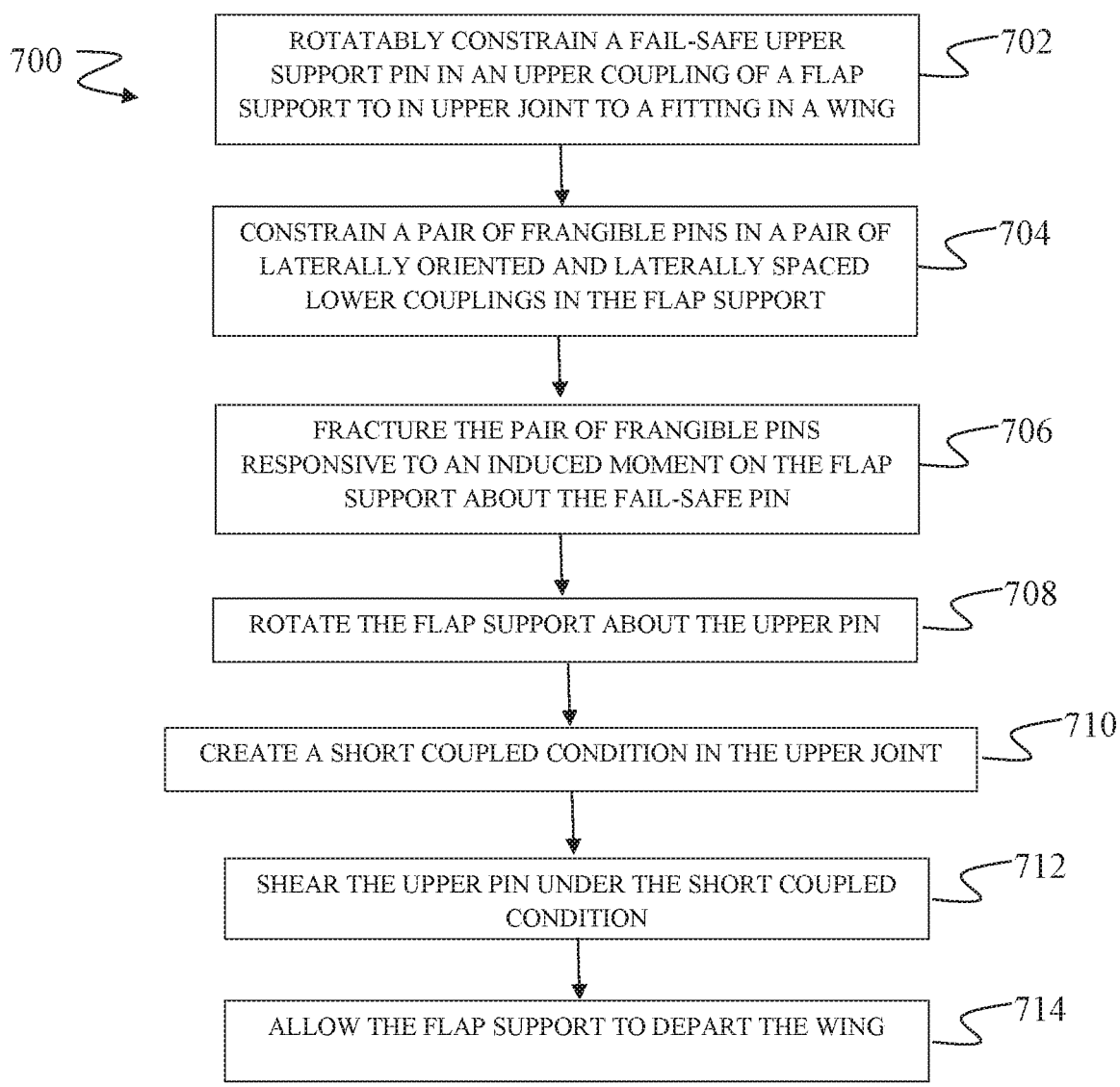

The implementation described herein provides a method 700 for disengaging a flap and flap support under adverse loading as shown in FIG. 7. A fail-safe upper support pin is rotatably constrained in an upper coupling of a flap support in an upper joint to a fitting in a wing, step 702. The fail-safe upper support pin is constrained by extending through upper aligned bores in an outboard upper clevis and an inboard upper clevis and associated outboard and inboard upper lugs of the flap support thereby providing a laterally-oriented rotatable upper coupling. In the example implementation, the fail-safe upper support pin is a load capable pin constrained in the outboard and inboard upper clevises with retention caps and a retention pin extending through the retention caps and a center bore in the load capable pin. A pair of frangible pins are constrained in a pair of laterally oriented and laterally spaced lower couplings in the flap support, step 704. An outboard lower support pin is constrained by extending through first lower aligned bores in an outboard lower clevis and an outboard lower lug and an inboard lower support pin is constrained by extending through second lower aligned bores in an inboard lower clevis and inboard lower lug. In the example implementation the outboard and inboard lower support pin each are a load limited pin constrained in one of the outboard and inboard lower clevises with retention caps and a retention pin extending through a center bore. The pair of frangible pins are fractured responsive to an induced moment on the flap support about the fail-safe pin, step 706. The flap support is rotated about the upper pin, step 708, creating a short coupled condition in the upper joint, step 710. The upper pin is then sheared under the short coupled condition, step 712, allowing the flap support to depart the wing, step 714.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard" and "upper" and "lower" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A flap support mounting assembly, comprising:
   a flap support having at least one laterally-oriented upper coupling and a laterally-oriented and laterally spaced pair of lower couplings;
   a fail-safe pin engaging the at least one laterally-oriented upper coupling to an upper rear-spar fitting; and
   a pair of frangible pins engaging the lower couplings to a pair of lower rear-spar fittings;
   wherein the frangible pins are configured to shear and enable the flap support to rotate upwards about the fail-safe pin in response to a load induced on the flap support that creates a moment inducing a sufficient shear force to shear the frangible pins, and
   wherein the fail-safe pin is configured to shear allowing separation of the flap support and associated flap from a wing structure in a manner that inhibits damage to a rear spar and integral fuel tank in the wing structure.

2. The flap support mounting assembly of claim 1, wherein the upper rear spar fitting comprises a clevis having a bore in which the fail-safe pin is received to secure the at least one laterally-oriented upper coupling.

3. The flap support mounting assembly of claim 1, wherein each of the pair of lower rear-spar fittings comprises a clevis having a bore in which the frangible pin is received to secure the pair of lower couplings to the pair of lower rear-spar fittings.

4. The flap support mounting assembly of claim 1, wherein upon inadvertent separation of only one frangible pin, the remaining frangible pin and fail-safe pin are sufficient to withstand flap operating loads to keep the flap support securely in place during aircraft operation.

5. A flap support mounting assembly comprising:
   flap support;
   outboard and inboard rear spar fittings attached to a wing structure and connected to the flap support through two upper joints and two lower joints, each joint having a clevis receiving an associated lug on the flap support;
   a fail-safe upper support pin extends through upper aligned bores in an outboard upper clevis and an inboard upper clevis of the two upper joints and associated outboard and inboard upper lugs of the flap support thereby providing a laterally-oriented rotatable upper coupling;
   an outboard lower support pin extending through first lower aligned bores in an outboard lower clevis of a first one of the two lower joints and an outboard lower lug; and
   an inboard lower support pin extending through second lower aligned bores in an inboard lower clevis of a second one of the two lower joints and inboard lower lug, said outboard lower support pin and said inboard lower support pin configured to be frangible to provide fusing capability at a shear out load.

6. The flap support mounting assembly of claim 5 wherein the flap support comprises an outboard rib and an inboard rib, said outboard upper lug and outboard lower lug extending from the outboard rib and said inboard upper lug and inboard lower lug extending from the inboard rib.

7. The flap support mounting assembly of claim 5 wherein the wing structure comprises an upper skin, a lower skin, and a rear spar web and the outboard and inboard rear spar fittings are attached with fasteners into the upper skin and lower skin and secured to the rear spar web with rivets thereby reacting loads on the flap support into the wing structure as shear loads.

8. The flap support mounting assembly of claim 6 wherein a flap actuation mechanism is supported by the flap support, said flap actuation mechanism comprising a crank assembly engaging an actuating rod, the actuating rod rotatably attached at a first end to the crank assembly and at a second end with a pivot pin to a flap carrier fitting mounted to a flap, the inboard rib and the outboard rib forming a clevis with a slot through which the actuating rod extends, said flap carrier fitting additionally received in the slot.

9. The flap support mounting assembly of claim 5 wherein the fail-safe upper support pin comprises a load capable pin constrained in the outboard and inboard upper devises with retention caps and a retention pin extends through the retention caps and a center bore in the load capable pin.

10. The flap support mounting assembly of claim 5 wherein the inboard and outboard lower support pins each comprise a load limited pin constrained in the one of the outboard and inboard lower devises with retention caps and a retention pin extending through a center bore, the load limited pins configured for a fracture strength to be frangible and fuse under an imposed shear load.

11. The flap support mounting assembly of claim 10 wherein fracture of the inboard and outboard lower support pins allows rotation of the flap support about the upper support pin.

12. The flap support mounting assembly of claim 11 wherein rotation of the flap support about the outboard and inboard upper clevises creates a short coupled condition in the upper joints at an interface of the upper skin and the upper support pin is configured to shear under the short coupled condition allowing the flap support with a flap actuation mechanism and attached flap to depart the wing.

13. The flap support mounting assembly of claim 5 wherein the outboard and inboard lower devises and associated outboard and inboard upper lugs are longitudinally offset but laterally parallel.

14. The flap support mounting assembly of claim 5 wherein the flap support comprises an outboard rib and an inboard rib, said outboard upper lug and outboard lower lug extending from the outboard rib and said inboard upper lug and inboard lower lug extending from the inboard rib,
the fail-safe upper support pin is constrained in the outboard and inboard upper clevises with retention caps and a retention pin extends through the retention caps and a center bore in the load capable pin, and,
the inboard and outboard lower support pins each comprise a load limited pin constrained in the one of the outboard and inboard lower devises with retention caps and a retention pin extending through a center bore, the load limited pins configured for a fracture strength to be frangible and fuse under an imposed shear load.

15. The flap support mounting assembly of claim 14 wherein the wing structure comprises an upper skin, a lower skin, and a rear spar web and the outboard and inboard rear spar fittings are attached with fasteners into the upper skin and lower skin and secured to the rear spar web with rivets thereby reacting loads on the flap support into the wing structure as shear loads.

16. A method for disengaging a flap and flap support under adverse loading, the method comprising:
rotatably constraining a fail-safe upper support pin in an upper coupling of a flap support in an upper joint to a fitting in a wing;
constraining a pair of frangible pins in a pair of laterally oriented and laterally spaced lower couplings in the flap support; and,
fracturing the pair of frangible pins responsive to an induced moment on the flap support about the fail-safe pin.

17. The method of claim 16 further comprising:
rotating the flap support about the upper support pin;
creating a short coupled condition in the upper joint;
shearing the upper support pin under the short coupled condition; and,
allowing the flap support to depart the wing.

18. The method of claim 16 wherein the step of rotatably constraining the fail-safe upper pin comprises:
constraining the fail-safe upper support pin extending through upper aligned bores in an outboard upper clevis and an inboard upper clevis and associated outboard and inboard upper lugs of the flap support thereby providing a laterally-oriented rotatable upper coupling.

19. The method of claim 18 wherein the step of constraining a pair of frangible pins comprises:
constraining an outboard lower support pin extending through first lower aligned bores in an outboard lower clevis and an outboard lower lug; and
constraining an inboard lower support pin extending through second lower aligned bores in an inboard lower clevis and inboard lower lug.

20. The method of claim 19 wherein
the fail-safe upper support pin comprises a load capable pin constrained in the outboard and inboard upper devises with retention caps and a retention pin extending through the retention caps and a center bore in the load capable pin, and
the outboard and inboard lower support pin each comprise a load limited pin constrained in one of the outboard and inboard lower devises with retention caps and a retention pin extending through a center bore.

* * * * *